United States Patent
Takeoka

(10) Patent No.: US 11,443,199 B2
(45) Date of Patent: Sep. 13, 2022

(54) PROGRAM STORAGE MEDIUM, APPARATUS AND METHOD PROVIDED WITH RULESET-SELECTABLE INFERENCE ENGINE

(71) Applicant: TAKEOKA LAB CORPORATION, Tokyo (JP)

(72) Inventor: Shozo Takeoka, Tokyo (JP)

(73) Assignee: TAKEOKA LAB CORPORATION, Tokyo (JP)

( * ) Notice: Subject to any disclaimer, the term of this patent is extended or adjusted under 35 U.S.C. 154(b) by 592 days.

(21) Appl. No.: 16/464,752

(22) PCT Filed: Dec. 6, 2017

(86) PCT No.: PCT/JP2017/043817
§ 371 (c)(1),
(2) Date: May 29, 2019

(87) PCT Pub. No.: WO2018/105656
PCT Pub. Date: Jun. 14, 2018

(65) Prior Publication Data
US 2019/0385068 A1    Dec. 19, 2019

(30) Foreign Application Priority Data
Dec. 7, 2016 (JP) .............................. JP2016-238031

(51) Int. Cl.
*G06N 5/02* (2006.01)
*G06N 20/10* (2019.01)
*G06N 5/04* (2006.01)

(52) U.S. Cl.
CPC ............. *G06N 5/027* (2013.01); *G06N 5/042* (2013.01); *G06N 20/10* (2019.01)

(58) Field of Classification Search
CPC ......... G06N 5/027; G06N 20/10; G06N 5/042
(Continued)

(56) References Cited

U.S. PATENT DOCUMENTS

| 5,119,470 A | 6/1992 | Highland et al. |
| 2005/0202845 A1 | 9/2005 | Sasaki |

(Continued)

FOREIGN PATENT DOCUMENTS

| JP | H05-204406 A | 8/1993 |
| JP | 2853818 B2 | 2/1999 |

(Continued)

OTHER PUBLICATIONS

Singh et al., "A comparative study of inference engines", 2010 Seventh international conference on information technology, 2010 (Year: 2010).*

(Continued)

*Primary Examiner* — Daniel T Pellett
(74) *Attorney, Agent, or Firm* — Oliff PLC

(57) ABSTRACT

An apparatus, a program-stored storage medium and a method with an inference engine can execute inference using a minimum ruleset in various applications. The apparatus includes: a machine learning engine being a classifying-type engine configured to include adapted-to-category learning models each generated by using each adapted-to-category set of teacher data, the adapted-to-category set being obtained by classifying teacher data for each category, and to use the learning models to output a category data corresponding to the inputted object data; a ruleset selector configured to select, from rulesets each prepared for each category and stored in a rule base, a ruleset corresponding to the category data outputted from the machine learning engine; and a rule engine configured to execute inference to the inputted object data by using the ruleset selected by the ruleset selector, and to output the inference result.

11 Claims, 7 Drawing Sheets

(58) Field of Classification Search
USPC .......................................................... 706/12
See application file for complete search history.

(56) References Cited

U.S. PATENT DOCUMENTS

| | | | | |
|---|---|---|---|---|
| 2008/0071714 | A1* | 3/2008 | Menich | G06N 5/041 |
| | | | | 706/45 |
| 2014/0201126 | A1* | 7/2014 | Zadeh | A61B 5/165 |
| | | | | 706/52 |
| 2015/0163242 | A1* | 6/2015 | Laidlaw | H04L 63/1433 |
| | | | | 726/22 |

FOREIGN PATENT DOCUMENTS

| | | |
|---|---|---|
| JP | 2005-258588 A | 9/2005 |
| JP | 2008-305129 A | 12/2008 |
| JP | 2011-113099 A | 6/2011 |

OTHER PUBLICATIONS

Written Opinion of the international Searching Authority PCT/JP2017/043817 (dated 2016).*

Mar. 6, 2018 International Search Report issued in International Patent Application No. PCT/JP2017/043817.

Mar. 6, 2018 Written Opinion issued in International Patent Application No. PCT/JP2017/043817.

"Japanese Morpheme Analysis System Juman". Kurohashi & Kawahara Lab., Language Media Processing, Intelligent Media Informatics, Department of Intelligence Science and Technology, Graduate School of Informatics, Kyoto University, [online], [Searching on Oct. 14, 2016], <URL: http://nlp.ist.i.kyoto-u.ac.jp/index.php?JUMAN>.

"Japanese Syntax-Genitive Anaphora Resolution System KNP". Kurohashi & Kawahara Lab., Language Media Processing, Intelligent Media Informatics, Department of Intelligence Science and Technology, Graduate School of Informatics, Kyoto University, [online], [Searching on Oct. 14, 2016], <URL: http://nlp.ist.i.kyoto-u.ac.jp/index.php?KNP>.

* cited by examiner

PROGRAM STORAGE MEDIUM, APPARATUS AND METHOD PROVIDED WITH RULESET-SELECTABLE INFERENCE ENGINE

TECHNICAL FIELD

The present invention relates to technology for constructing an inference engine.

This application claims the benefit of priority under the Paris Convention from Japanese patent application No. 2016-238031, filed on Dec. 7, 2016, which is incorporated herein by reference in accordance with PCT rule 20.6.

BACKGROUND ART

Recently, AI (Artificial Intelligence) technology has been applied to various application. Especially, machine learning engines, such as support vector machines having statistics analysis function and neural networks having calculation function, are attracting much attention. These engines are configured not to execute logical processing by using expert knowledge, but to use a large amount of teacher data to execute statistical processing.

Meanwhile, rule analysis AI such as expert system has been applied to applications requiring logical determination using expert knowledge. The expert system is constituted of: a rule base in which accumulated are pre-described rules (logics) for a particular field; and an inference engine repeating process of matching with the rules. Each rule is described in natural language form of "if . . . then . . . ". Thus, the expert system is suitable for language processing in the case of, for example, interactive user interface.

As a conventional example of the expert system, Patent Document No. 1 discloses a technique for integrating forward inference and backward inference. The technique executes backward inference unless rules exist and, when detecting a rule, executes forward inference. Another technique of the expert system is disclosed in Patent Document No. 2, in which if-then rules are learned in a self-reproducing neural network. The technique execute inference by using the result of learning if-then rules as input patterns.

CITATION LIST

Patent Documents

Patent Document No. 1: Japanese Patent No. 2853818
Patent Document No. 2: Japanese Patent Laid-Open Publication No. 2008-305129

Non-Patent Documents

Non-patent Document No. 1: "Japanese Morpheme Analysis System JUMAN", Kurohashi & Kawahara Lab., Language Media Processing, Intelligent Media Informatics, Department of Intelligence Science and Technology, Graduate School of Informatics, Kyoto University, [online], [Searching on Oct. 14, 2016], the Internet <URL: http://nlp.ist.i.kyoto-u.ac.jp/index.php?JUMAN>
Non-patent Document No. 2: "Japanese Syntax-Genitive Anaphora Resolution System KNP", Kurohashi & Kawahara Lab., Language Media Processing, Intelligent Media Informatics, Department of Intelligence Science and Technology, Graduate School of Informatics, Kyoto University, [online], [Searching on Oct. 14, 2016], the Internet <URL: http://nlp.ist.i.kyoto-u.ac.jp/index.php?KNP>

SUMMARY OF THE INVENTION

Problem to be Solved by the Invention

The inference engine that utilizes a rule base requires to accumulate a large amount of rules in the rule base corresponding to various situations. The wider the application range of the inference engine is (the less the application range is narrowed down), the larger amount of rules are required because more diversified rules should be considered in the wider application range case. The increase of the amount of rules brings about the increases of processing time and needed calculation and memory amount. Also, the large amount of rules has a tendency to cause the logical expert result to be obscure. In this situation, it is required to minimize the processing time and the needed calculation and memory amount in the case that the inference engine is mounted on a smartphone of a user or a built-in equipment for IoT (Internet of Things) system, besides a high-speed and large capacity server.

It is therefore an object of the present invention to provide a program, an apparatus and a method provided with an inference engine that can execute inference using a minimum ruleset (rule group) in various applications.

Means to Solve the Problem

According to the present invention, there provided is a program to be executed by a computer mounted on an inference apparatus outputting a result of inferring inputted object data, the program causing the computer to function as:

a machine learning engine being a classifying-type engine configured to include adapted-to-category learning models each generated by using each adapted-to-category set of teacher data, the adapted-to-category set being obtained by classifying teacher data for each category, and to use the learning models to output a category data corresponding to the inputted object data;

a ruleset selector configured to select, from rulesets each prepared for each category and stored in a rule base, a ruleset corresponding to the category data outputted from the machine learning engine; and a rule engine configured to execute inference to the inputted object data by using the ruleset selected by the ruleset selector, and to output the inference result.

As an embodiment of the program according to the present invention, it is preferable that the machine learning engine includes a plurality of support vector machines each of which corresponds to each category, the support vector machine, in a learning phase, inputs pairs of a value showing whether to belong to a target category or not and teacher data and thus generates a learning model, and the support vector machine, in an operating phase, inputs object data and thus outputs a value showing whether the object data belongs to the target category or not by using the learning model.

As another embodiment of the program according to the present invention, it is also preferable that the object data and the teacher data are text data and the program further causes the computer to function as:

a preprocessing executer configured to output a set of morphemes obtained from individual text data of the object data and the teacher data, wherein the set of morphemes obtained from the object data is inputted in both of the machine learning engine and the rule engine, and the set of morphemes obtained from the teacher data is inputted in the machine learning engine.

As another embodiment of the program according to the present invention, it is also preferable that the program further causes the computer to function as:

a middle arguments generator configured to receive, from the preprocessing executor, the set of morphemes obtained from the object data, and to output, to the rule engine, a plurality of middle arguments (middle terms) as the object data, the plurality of middle arguments corresponding to each of different purposes, wherein the rule engine executes backward chaining of the middle arguments as the object data by using the selected ruleset and thus outputs the inference result.

As another embodiment of the program according to the present invention, it is also preferable that the middle arguments generator is a functional means described in LISP which is an expression-oriented and procedural functional-programming language.

As another embodiment of the program according to the present invention, it is also preferable that the object data and the teacher data are email text data, and the category data is data showing whether the text data is automatically-distributed email data or not, whether the text data is business email data or not, or whether the text data is private email data or not.

As another embodiment of the program according to the present invention, it is also preferable that the rule engine is a functional means described in Prolog which is an expression-oriented and nonprocedural logical-programming language.

As another embodiment of the program according to the present invention, it is also preferable that the object data and the teacher data are multimedia data and the program further causes the computer to function as:

a preprocessing executer configured to output a set of text elements given to each multimedia data of the object data and the teacher data, wherein the set of text elements given to the object data is inputted in both of the machine learning engine and the rule engine, and the set of text elements given to the teacher data is inputted in the machine learning engine.

As another embodiment of the program according to the present invention, it is also preferable that the object data and the teacher data are sensor type data and measurement values, a set of sensor type data and measurement values of the object data is inputted in both of the machine learning engine and the rule engine, and a set of sensor type data and measurement values of the teacher data is inputted in the machine learning engine.

According to the present invention, there provided is an inference apparatus outputting a result of inferring inputted object data, the inference apparatus comprising:

a machine learning engine being a classifying-type engine configured to include adapted-to-category learning models each generated by using each adapted-to-category set of teacher data, the adapted-to-category set being obtained by classifying teacher data for each category, and to use the learning models to output a category data corresponding to the inputted object data;

a ruleset selector configured to select, from rulesets each prepared for each category and stored in a rule base, a ruleset corresponding to the category data outputted from the machine learning engine; and a rule engine configured to execute inference to the inputted object data by using the ruleset selected by the ruleset selector, and to output the inference result.

According to the present invention, there provided is an inference method executed in an inference apparatus outputting a result of inferring inputted object data, the inference apparatus comprising:

a machine learning engine configured to include adapted-to-category learning models each generated by using each adapted-to-category set of teacher data, the adapted-to-category set being obtained by classifying teacher data for each category; and a rule base configured to store in advance rulesets each prepared for each category, the inference method comprising:

a first step, executed by the machine learning engine, of receiving the inputted object data and using the learning models to output a category data corresponding to the inputted object data;

a second step of selecting, from the rulesets stored in the rule base, a ruleset corresponding to the category data outputted from the machine learning engine; and a third step of executing inference to the inputted object data by using the ruleset selected in the second step, and then outputting the inference result.

Advantageous Effects of the Invention

A program, an apparatus and a method according to the present invention enable to execute inference using a minimum ruleset in various applications.

EMBODIMENTS OF THE INVENTION

Illustrative embodiments of the present invention will be described below with reference to the drawings.

Figure 1:
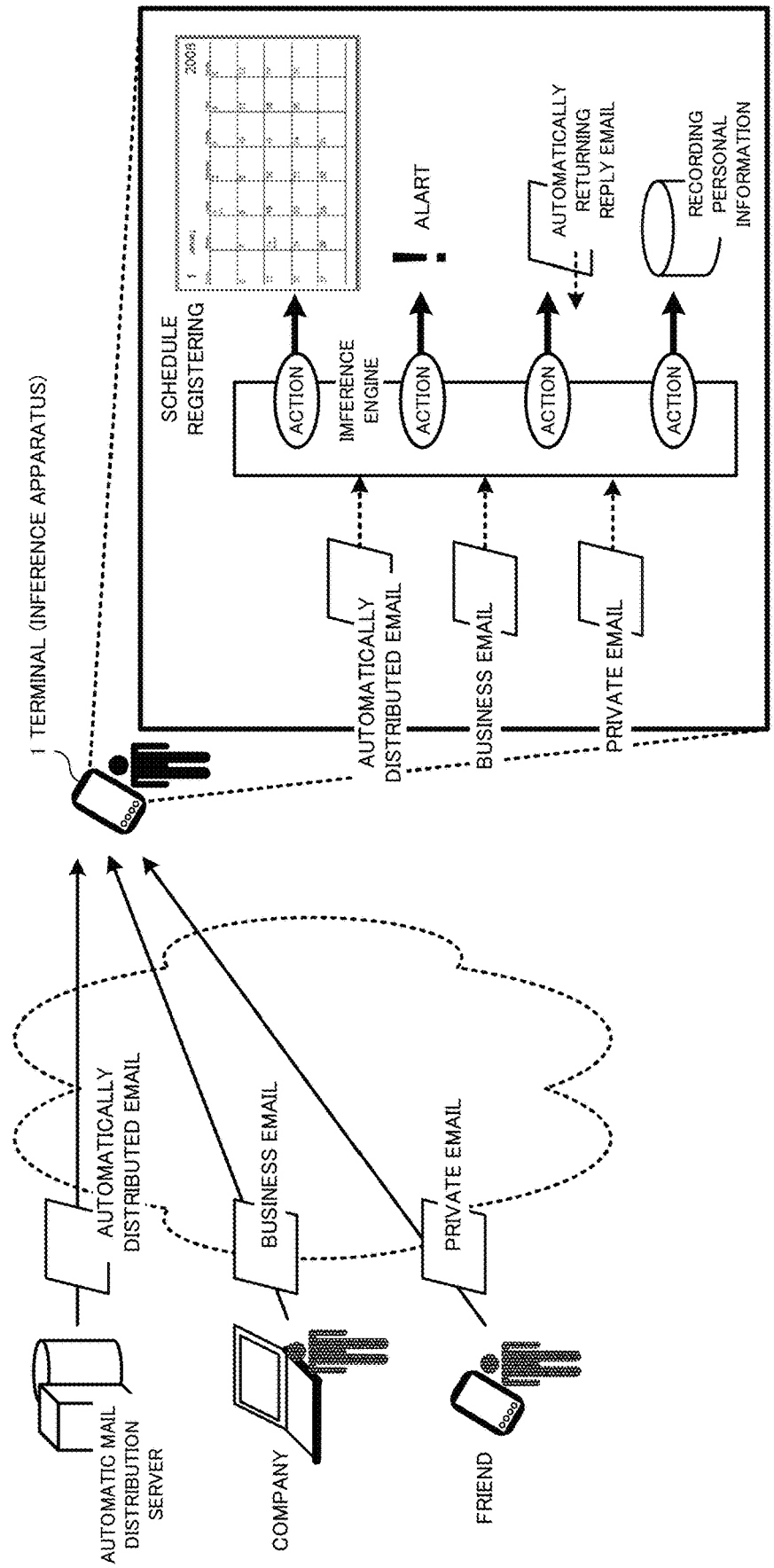
FIG. 1 is a configuration diagram illustrating a system according to the present invention.

FIG. 1 is a configuration diagram illustrating a system according to the present invention.

A program with inference function according to the present invention is configured to function a computer mounted on an inference apparatus and to output the inference result corresponding to inputted object data. As shown in FIG. 1, the program according to the present invention is mounted on a terminal 1 that a user possesses. In this embodiment, an electronic mail (email) software is installed on the terminal 1 by the user, thus the terminal 1 can receive various emails. There are various categories of received emails such as business emails, private emails, and automatically-distributed emails such as mail magazines. By appropriately inferring the content of such a received email, the terminal 1 can automatically execute many kinds of actions corresponding to the inference result.

For example, the user's terminal 1 may automatically return a reply email to an email received from an automatic mail distribution server. Also, when receiving an email including an appointment request to the user, the terminal 1 may automatically register the appointment in a scheduler application for the user. Further, the terminal 1 may notify the user of an alert when receiving an email including an important business information for the user. When receiving an email with notification to the user of an important information, the terminal 1 may register the information in a database. As described above, the terminal 1 can utilize the result of inferring the content of emails for various applications.

In the process of the present invention, there are two phases as described below.

<Learning phase>: inputting teacher data (including object data and a category (category data) related to the object data) and thus generating a learning model <Operation phase>: inputting object data and thus outputting a category (category data) of the object data using the learning model As an embodiment of the present invention, an inference apparatus inputs email text data as object data, and then outputs, to application programs, action information generated from the result of inferring the email text data. Here in this case, the email text data can be classified into two kinds of email data; business email data and private email data. Then, the inference apparatus judges whether the inputted email text data are business email data or private email data, and infers an action by using a ruleset selected according to the judge result.

Figure 2:
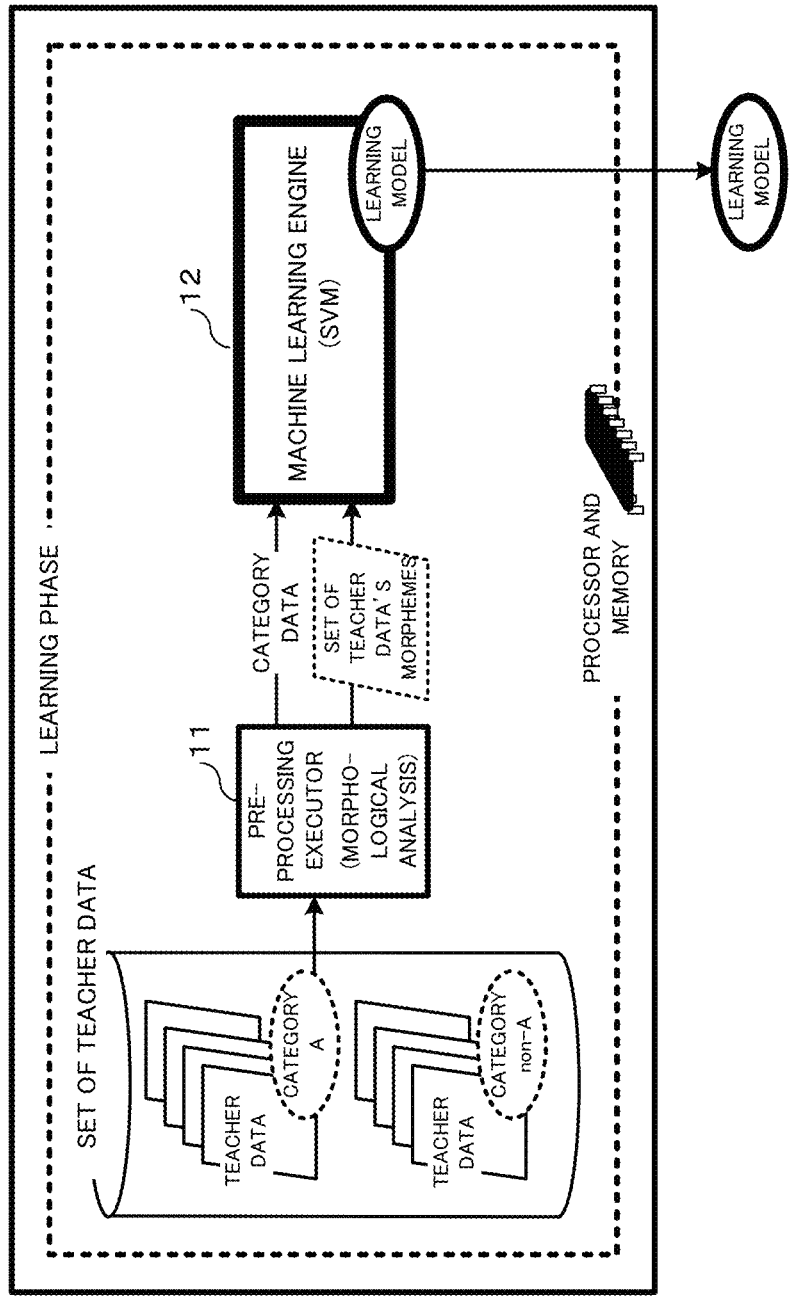
FIG. 2 is a functional block diagram illustrating one embodiment of the learning phase in a program according to the present invention.

<Learning phase> FIG. 2 is a functional block diagram illustrating one embodiment of the learning phase in a program according to the present invention.

In the embodiment of the learning phase shown in FIG. 2, the inference apparatus 1 is constructed to include a preprocessing executer 11 configured to input a set of teacher data, and a machine learning engine 12. These functional units are embodied by executing, on a computer mounted on the apparatus 1, a program according to the present invention, the program being stored in a memory (storage medium) in the apparatus 1. Further, the processing flow visualized by arrows can be understood as an embodiment of a learning method in the apparatus 1.

(Preprocessing executer 11) The preprocessing executer 11 is configured to execute a preprocessing to teacher data. For example, as the teacher data, there are text data, multimedia data, or sensor measurement values.

(Text data) for example, email text data (Multimedia data) for example, image data or video data to which text elements are given (Sensor measurement values) for example, sensor type data and measurement values obtained from a sensor mounted on a smartphone In the case that the teacher data are text data, the preprocessing executer 11 outputs a set of morphemes obtained from the text data. The preprocessing executer 11 divides each sentence in the text data into morphemes by morpheme analysis, which is a technique for using grammar information and word dictionaries to divide a sentence described in a natural language into morphemes that are minimum units each having a meaning in the sentence. The preprocessing executer 11 also determines and stores grammatical part of speech of each obtained morpheme, and then outputs, to the machine learning engine 12, a set of morphemes obtained from the text data as the teacher data.

In this embodiment, the preprocessing executer 11 uses free software developed by Kyoto University to execute morpheme and syntactic analyses. Specifically, JUMAN (see, for example, Non-patent Document No. 1) is used for the morpheme analysis, and KNP (see, for example, Non-patent Document No. 2) is used for the syntactic analysis. For example, each sentence included in emails in mbox form is analyzed by JUMAN and KNP, thus outputted is the analysis result in S-expression (Symbol-expression) format, which is a description format for describing a binary tree structure or a list structure and is generally used in LISP.

In the case that the teacher data are multimedia data, The preprocessing executer 11 outputs, to the machine learning engine 12, a set of text elements given to the multimedia data. In the case that the teacher data are sensor measurement values, The preprocessing executer 11 outputs, to the machine learning engine 12, a set of sensor type data and measurement values.

(Machine learning engine 12) The machine learning engine 12 is a classifying-type engine including adapted-to-category learning models each generated by using each adapted-to-category set of teacher data, which is obtained by classifying teacher data for each category.

Here, the machine learning engine 12 may be a plurality of support vector machines each of which corresponds to each category. The support vector machine is a classifying-type pattern identification model to which supervised learning applies, which generally includes two-class-type pattern identifier constructed of linear input elements. In the support vector machine, executed is learning process of learning the linear input elements' parameters obtained from calculating distance corresponding to the feature quantity of each teacher data. Thus, the support vector machine can exhibit high identification performance to non-learned data, however the reliability of learning result in the support vector machine is affected directly by the quality (reliability) of the teacher data.

For example, consider the case that a support vector machine is used to classify obtained email data into business email data and private email data. In the case, teacher data is set to include pairs of business email text data and a category identification value that is indicative of business email text data, and pairs of private email text data and a category identification value that is indicative of private email text data. By contrast, the machine learning engine 12 is provided with a first support vector machine for identifying business email data and a second support vector machine for identifying private email data. In the first support vector machine, a first learning model is constructed by inputting business email text data, and in the second support vector machine, a second learning model is constructed by inputting private email text data. Thus, the first part of the machine learning engine is able to judge whether the obtained email is a business email or not, and the second part of the machine learning engine is able to judge whether the obtained email is a private email or not. Further, these support vector machines can output a reliability value that indicates the reliability of the identification result. By using the reliability values outputted from a plurality of support vector machines, the outputted category identification value (category data) that has the largest reliability value can be chosen as the best identification result.

Figure 3:
FIG. 3 is a schematic diagram illustrating an example of feature parameters extracted in the machine learning engine.

FIG. 3 is a schematic diagram illustrating an example of feature parameters extracted in the machine learning engine.

The support vector machines of the machine learning engine may be configured to learn feature parameters extracted from the text of teacher data. In the example shown in FIG. 3, a 188-dimentional vector as the feature parameters is extracted.

Figure 4:
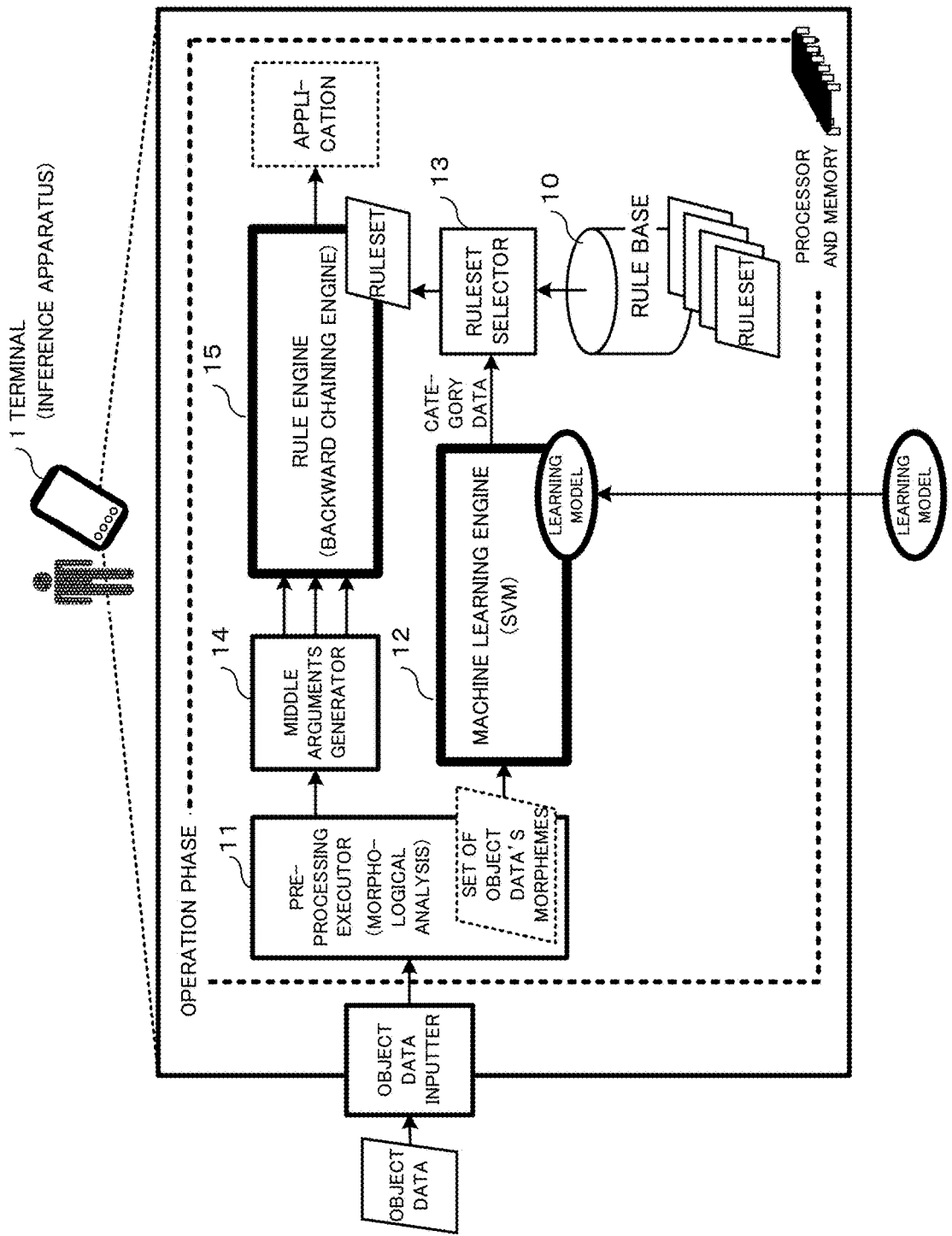
FIG. 4 is a functional block diagram illustrating one embodiment of the operation phase in a program according to the present invention.
Figure 5:
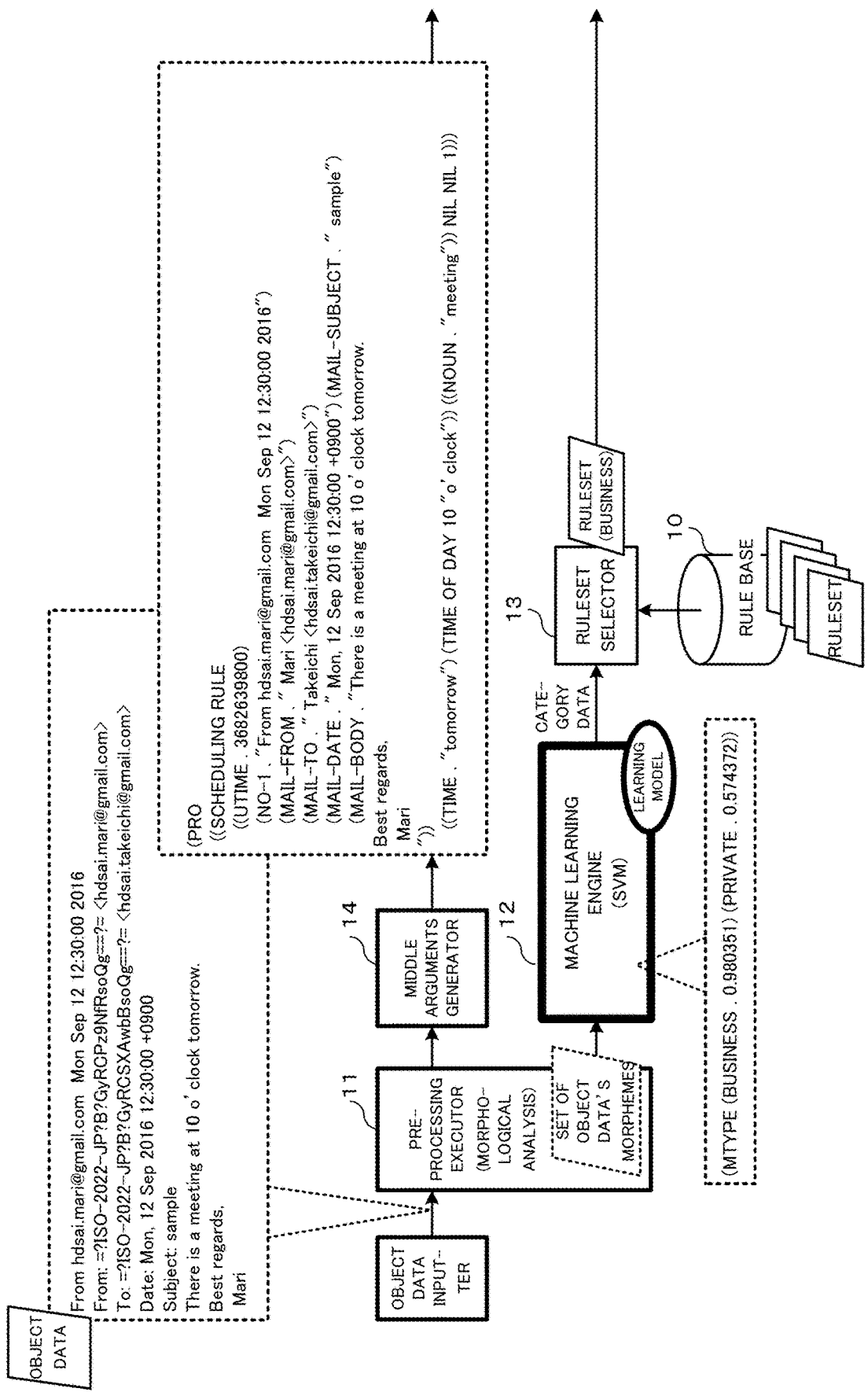
FIG. 5 is a schematic diagram illustrating the flow of processing to business email data executed by the functional units (blocks)
Figure 6:
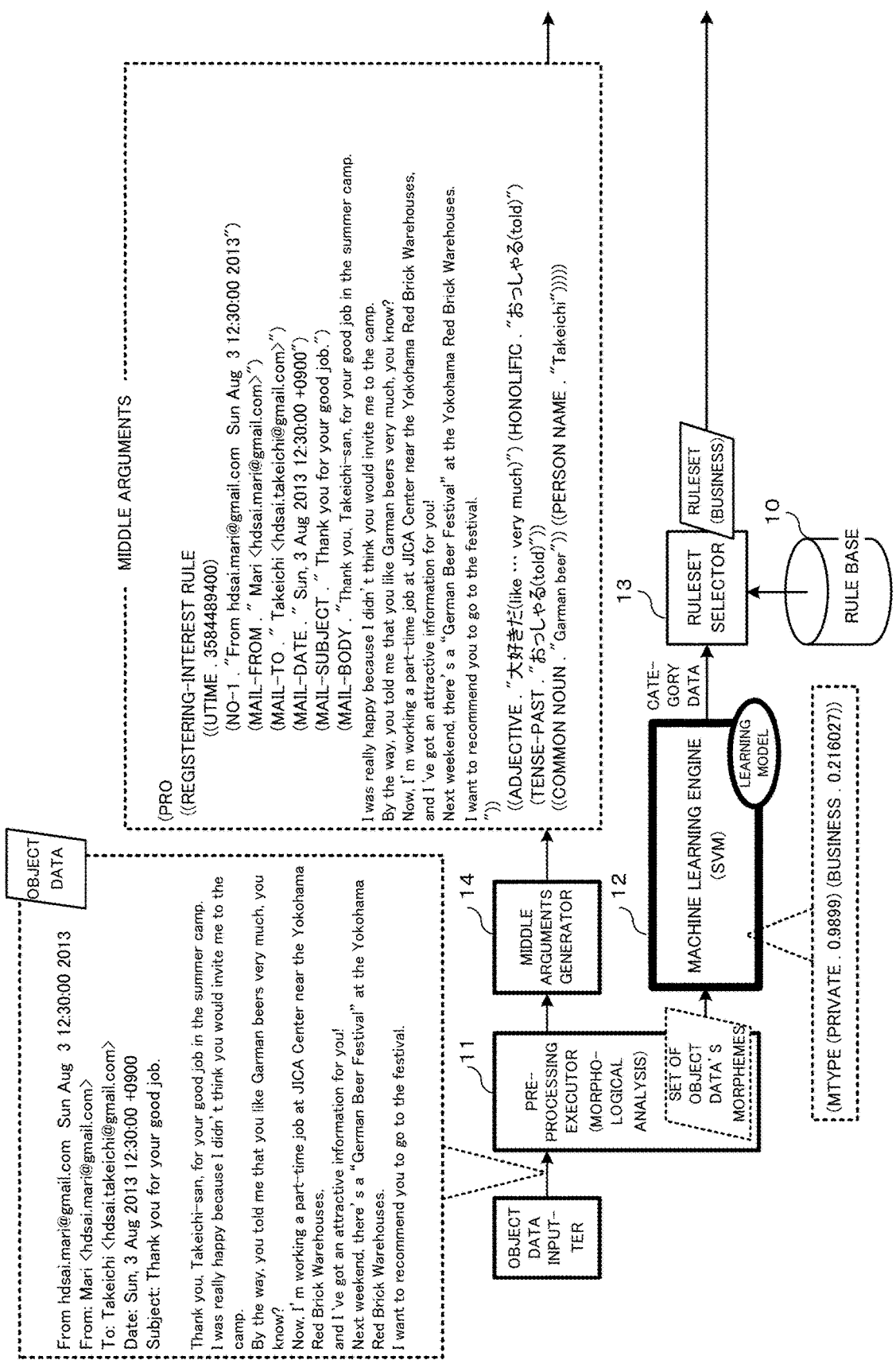
FIG. 6 is a schematic diagram illustrating the flow of processing to private email data executed by the functional units (blocks)

<Operation phase> FIG. 4 is a functional block diagram illustrating one embodiment of the operation phase in a program according to the present invention. FIG. 5 is a schematic diagram illustrating the flow of processing to business email data executed by the functional units (blocks). FIG. 6 is a schematic diagram illustrating the flow of processing to private email data executed by the functional units (blocks).

As shown in FIG. 4, the inference apparatus 1 is configured to include, in the operation phase, a rule base 10, a preprocessing executor 11, a machine learning engine 12, a ruleset selector 13, a middle arguments generator 14, and rule engine 15. These functional units are embodied by executing a corresponding program of the present invention, which is stored in a memory of the apparatus, on a computer mounted on the apparatus. Further, the processing flow of the functional units can be understood as an inference method performed in the apparatus.

(Preprocessing executor 11) In the operation phase, the preprocessing executor 11 executes the preprocessing to object data, which is the same processing as that in the above-described learning phase. The set of text elements (morphemes) extracted by the preprocessing executor 11 is inputted in both of the machine learning engine 12 and the rule engine 15. In a case shown in FIG. 5, the preprocessing executor 11 receives, as object data, email data that schedules a meeting starting at 10 o'clock. In another case shown in FIG. 6, the preprocessing executor 11 obtains, as object data, private email data.

(Machine learning engine 12) In the operation phase, the machine learning engine 12 includes learning models generated in the learning phase, and uses the learning models to output a category data corresponding to inputted object data.

In the case shown in FIG. 5, the machine learning engine 12 receives a set of the business email's morphemes outputted from the preprocessing executor 11, and then outputs category data as judgement results of whether the category of the received email data is "business" or not and whether the category of the received email data is "private" or not. The support vector machines of the machine learning engine 12 also output reliabilities of the outputted category data. In the case of FIG. 5, the outputted reliability of category data "business" is 0.98, and the outputted reliability of category data "private" is 0.57. Therefore, in this case, the category data "business" is outputted to the ruleset selector 13.

In the case shown in FIG. 6, the machine learning engine 12 receives a set of the private email's morphemes outputted from the preprocessing executor 11, and then outputs category data as judgement results of whether the category of the received email data is "business" or not and whether the category of the received email data is "private" or not. In the case of FIG. 6, the outputted reliability of category data "private" is 0.98, and the outputted reliability of category data "business" is 0.21. Therefore, in this case, the category data "private" is outputted to the ruleset selector 13.

(Rule base 10) The rule base 10 is configured to store rulesets each of which is prepared for each category. The ruleset, which is a knowledge for resolving problems, is a set of production rules as has a form described below.

"if <condition> then <conclusion>"

In the cases shown in FIG. 5 and FIG. 6, the rule base 10 possesses a ruleset for business email data and a ruleset for private email data.

(Ruleset selector 13) The ruleset selector 13 is configured to select, from the rulesets stored in the rule base 10, a ruleset corresponding to the category data outputted from the machine learning engine 12. In the cases shown in FIG. 5 and FIG. 6, when the machine learning engine determines that the category of the email data is "business", the ruleset selector 13 selects a ruleset for "business" email data from the rulesets stored in the rule base 10. On the other hand, when the machine learning engine 12 determines "private", the ruleset selector 13 selects a ruleset for "private" email data from the rule base 10. In this manner, the ruleset to be used is changed according to the category outputted from the machine learning engine 12.

(Middle arguments generator 14) The middle arguments generator 14 is configured to receive, from the preprocessing executor 11, a set of morphemes obtained from object data, then to output, to the rule engine 15, a plurality of middle arguments (middle terms/sentences or middle goals), as the object data, each of which corresponds to each of different purposes.

Specifically, the middle arguments generator 14 may be a functional means described in LISP which is an expression-oriented and procedural functional-programming language. FIG. 4 shows an example of middle arguments of business email data, and FIG. 5 shows an example of middle arguments of private email data.

Middle arguments (middle terms/sentence) is generated through pattern matching of a set of morphemes outputted from the preprocessing executor 11. For example, by estimating a sentence element, e.g. a subject (S), a predicate (V), a complement (C) or an object (0), of each morpheme based on the determined grammatical part of speech, the set of morphemes is matched with sentence types of, e.g. SVO, SVC, SVOO or SVOC, thus the middle arguments (middle terms/sentence) is generated. Further, the middle arguments is generated by mainly focusing on important words that appear in the email text data, specifically listing the header and body of the email text data, which is also called as communication meta information.

(Rule engine 15) The rule engine 15 is configured to execute inference to the inputted object data using the ruleset selected by the ruleset selector 13, then to output the inference result. Specifically, the rule engine 15 may be a functional means described in Prolog which is an expression-oriented and nonprocedural logical-programming language.

The rule engine 15 inputs a plurality of middle arguments and execute backward inference (backward chaining) of the middle arguments using the selected ruleset, and thus output the result of the backward chaining. Here, the backward chaining is a technique to infer, in the case of treating an event in which cause and effect are assumed, whether the effect is derived from the cause or not by finding, going back from the effect, establishment conditions (assertions) and inference rules (rules). In the beginning of the backward chaining, a first assertion for establishing the effect (conclusion) is extracted, and then a second assertion for establishing the first assertion is extracted. In repeating the extraction process, if the last extracted assertion coincides with the assumed cause, the assumed cause is inferred to be correct. On the contrary, if any assertion and rule is no longer found on the way of the assertion process, the assumed cause is inferred to be erroneous.

The assertions are stored in a working memory and appropriately matched with rules included in the selected ruleset. The rule engine 15 repeatedly executes the following steps of: matching the assertions and "if <condition>"s of the rules; triggering the "then <conclusion>" corresponding to the "if <condition>" that is matched with the assertion; firing a new rule which is included in a group of triggered rules; and storing, in the working memory, the fired rule as an assertion.

In the above-described embodiment shown in FIGS. 4-6, the middle arguments generator 14 (LISP engine) and the rule engine (Prolog engine) are functioning as a double symbolic inference (symbolic reasoning) engine. In addition in the embodiment, there functioning is a hybrid inference engine including the double symbolic inference engine and the machine learning engine (support vector machines).

Figure 7:
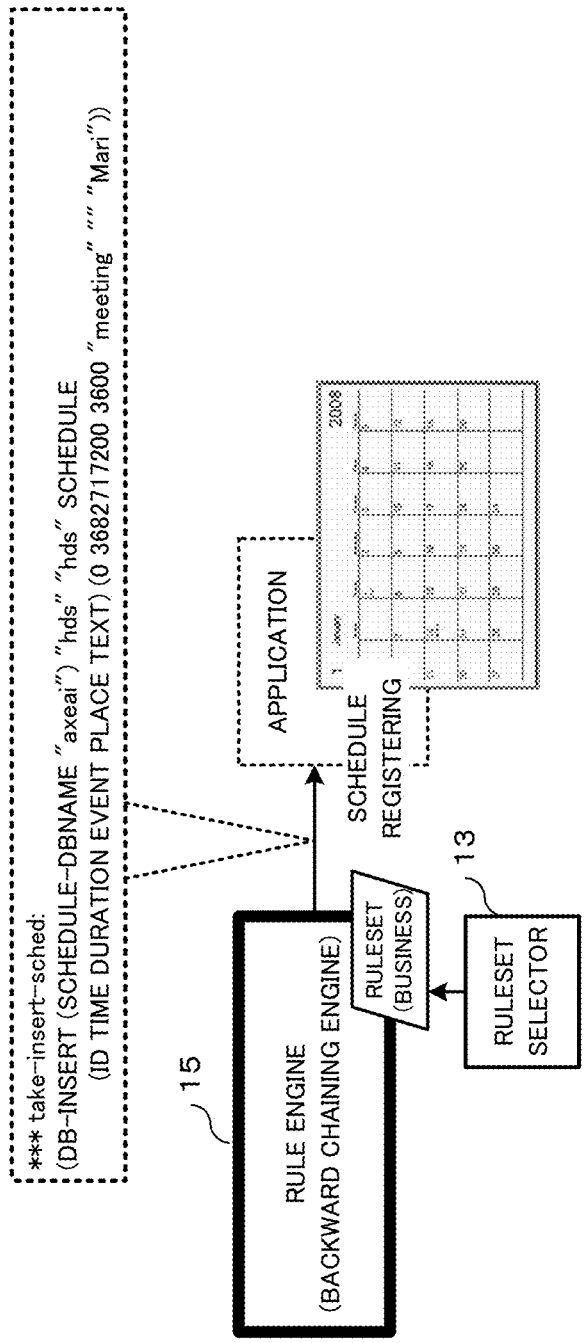
FIG. 7 is a schematic view showing an example of command outputted from the rule engine.

FIG. 7 is a schematic view showing an example of command outputted from the rule engine.

In the example shown in FIG. 7, the rule engine 15 outputs a command for automatically registering, to a scheduler, date and time of meeting that is inferred from the business email data. The inference process is executed by using a ruleset suitable to business email data. The rule engine 15 can execute the inference processing to email text data for various uses by using rulesets each selected according to the category of each use. For example, a ruleset can be prepared, which is suitable for inferring a mail sender's favorable impression to the receiver based on the content of email data. Further, it is also possible to prepare a ruleset suitable for inferring an information that is not directly read from the content of email data.

As described in detail, a program, a apparatus and a method according to the present invention is provided with an inference engine enabling to execute inference using a minimum ruleset in various applications.

Many widely different alternations and modifications of the above-described various embodiments of the present invention may be constructed without departing from the spirit and scope of the present invention. All the foregoing embodiments are by way of example of the present invention only and not intended to be limiting. Accordingly, the present invention is limited only as defined in the following claims and equivalents thereto.

REFERENCE SIGNS LIST

1 terminal, inference apparatus; 10 rule base; 11 preprocessing executer; 12 machine learning engine; 13 ruleset selector; 14 middle arguments generator; and 15 rule engine.

What is claimed is:

1. A non-transitory computer-readable storage medium on which is stored a program to be executed by a computer mounted on an inference apparatus outputting a result of inferring inputted object data, the program causing the computer to:

function as a machine learning engine that is a classifying-type engine configured to include adapted-to-category learning models each generated by using each adapted-to-category set of teacher data, each of the adapted-to-category set being obtained by classifying teacher data for each category, the computer, functioning as the machine learning engine, receives the inputted object data and uses the learning models to output a category data corresponding to the inputted object data;

select, from a plurality of rulesets each prepared for each category and stored in a rule database, a ruleset corresponding to the category outputted from the machine learning engine corresponding to the inputted object data; and function as a rule engine by executing inference to the inputted object data by using the selected ruleset as a ruleset of the category outputted from the machine learning engine that corresponds to the inputted object data, and outputting the inference result to execute processing based on the inference result.

2. The non-transitory computer-readable storage medium as claimed in claim 1, wherein:

the machine learning engine includes a plurality of support vector machines each of which corresponds to each category, the computer is configured to, as the support vector machine in a learning phase, input pairs of a value showing whether to belong to a target category or not and teacher data, and generate a learning model, and the computer is configured to, as the support vector machine in an operating phase, input object data, and output a value showing whether the object data belongs to the target category or not by using the learning model.

3. The non-transitory computer-readable storage medium as claimed in claim 1, wherein:

the object data and the teacher data are text data, the program further causes the computer to output a set of morphemes obtained from individual text data of the object data and the teacher data, the set of morphemes obtained from the object data is inputted in both of the machine learning engine and the rule engine, and the set of morphemes obtained from the teacher data is inputted in the machine learning engine.

4. The non-transitory computer-readable storage medium as claimed in claim 3, wherein the program further causes the computer to:

receive, functioning as a middle arguments generator, the set of morphemes obtained from the object data, and output, to the rule engine, a plurality of middle arguments as the object data, the plurality of middle arguments corresponding to each of different purposes, wherein the computer, as the rule engine, executes backward chaining of the middle arguments as the object data by using the selected ruleset, and outputs the inference result.

5. The non-transitory computer-readable storage medium as claimed in claim 4, wherein the computer, as the middle arguments generator, is described in LISP which is an expression-oriented and procedural functional-programming language.

6. The non-transitory computer-readable storage medium as claimed in claim 3, wherein:

the object data and the teacher data are email text data, and the category is data showing whether the text data is automatically-distributed email data or not, whether the text data is business email data or not, or whether the text data is private email data or not.

7. The non-transitory computer-readable storage medium as claimed in claim 1, wherein the computer, as the rule engine, is described in Prolog which is an expression-oriented and nonprocedural logical-programming language.

8. The non-transitory computer-readable storage medium as claimed in claim 1, wherein:
the object data and the teacher data are multimedia data,
the program further causes the computer to output a set of text elements given to each multimedia data of the object data and the teacher data,
the set of text elements given to the object data is inputted in both of the machine learning engine and the rule engine, and
the set of text elements given to the teacher data is inputted in the machine learning engine.

9. The non-transitory computer-readable storage medium as claimed in claim 1, wherein
the object data and the teacher data are sensor type data and measurement values,
a set of sensor type data and measurement values of the object data is inputted in both of the machine learning engine and the rule engine, and
a set of sensor type data and measurement values of the teacher data is inputted in the machine learning engine.

10. An inference apparatus outputting a result of inferring inputted object data, the inference apparatus comprising:
a processor programmed to:
function as a machine learning engine that is a classifying-type engine configured to include adapted-to-category learning models each generated by using each adapted-to-category set of teacher data, the adapted-to-category set being obtained by classifying teacher data for each category, the processor, functioning as the machine learning engine, receives the inputted object data and uses use the learning models to output a category corresponding to the inputted object data;
select, from a plurality of rulesets each prepared for each category and stored in a rule database, a ruleset corresponding to the category data outputted from the machine learning engine corresponding to the inputted object data; and
function as a rule engine by executing inference to the inputted object data by using the selected ruleset as a ruleset of the category outputted from the machine learning engine that corresponds to the inputted object data, and outputting the inference result to execute processing based on the inference result.

11. An inference method executed by a processor of an inference apparatus outputting a result of inferring inputted object data, the processor of the inference apparatus functioning as a machine learning engine that includes adapted-to-category learning models each generated by using each adapted-to-category set of teacher data, the adapted-to-category set being obtained by classifying teacher data for each category, and the inference apparatus including a memory that stores a rule database that stores, in advance, a plurality of rulesets each prepared for each category, the inference method comprising:
a first step, executed by the processor as the machine learning engine, of receiving the inputted object data and using the learning models to output a category data corresponding to the inputted object data;
a second step, by the processor, of selecting, from the rulesets stored in the rule database in the memory, a ruleset corresponding to the category outputted from the machine learning engine corresponding to the inputted object data; and
a third step, by the processor, of executing inference to the inputted object data by using the ruleset selected in the second step as a ruleset of the category outputted from the machine learning engine that corresponds to the inputted object data, and then outputting the inference result to execute processing based on the inference result.

* * * * *